United States Patent [19]

Beatenbough et al.

[11] 3,718,281
[45] Feb. 27, 1973

[54] THERMOSTATIC VACUUM POSITIONER

[75] Inventors: Paul Beatenbough, Medina; Ward H. Hutchins; Gary E. Richards, both of Lockport, all of N.Y.

[73] Assignee: General Motors Corporation, Detroit, Mich.

[22] Filed: Dec. 9, 1971

[21] Appl. No.: 206,263

[52] U.S. Cl.....................237/2 A, 165/16, 165/42, 236/5, 236/13, 236/87, 237/12.3 A
[51] Int. Cl...............................................F25b 29/00
[58] Field of Search ..........165/16, 42; 236/5, 13, 87; 237/2 A, 12–3 A

[56] References Cited

UNITED STATES PATENTS

| | | | |
|---|---|---|---|
| 2,481,630 | 9/1949 | Tramontini | 237/2 A X |
| 3,373,934 | 3/1968 | Kolbe et al. | 237/2 A X |
| 3,406,904 | 10/1968 | Muzzi et al. | 237/2 A |
| 3,414,193 | 12/1968 | Franz | 237/2 A |
| 3,082,955 | 3/1963 | Obermauer | 237/2 A |
| 3,455,505 | 7/1969 | Beatenbough et al. | 236/13 X |

Primary Examiner—William F. O'Dea
Assistant Examiner—Peter D. Ferguson
Attorney—W. S. Pettigrew et al.

[57] ABSTRACT

An automatic temperature control system for air conditioning the passenger compartment of an automobile utilizing a spirally wound bimetal to sense the temperature of air which is drawn through an opening in the dashboard and through an ambient temperature compensating heat exchanger. The center of the spiral bimetal is supported by a shaft while the peripheral end of the bimetal coacts with an air bleed valve assembly which is connected to a vacuum pressure source and a vacuum motor to position an air damper for producing desirable air temperatures in the passenger compartment. The air bleed valve is movable with respect to the bimetal in response to settings of a dash mounted control adapted to be manually set for a temperature desired in the passenger compartment. A feedback mechanism which operates in correspondence to the position of the damper rotates the interconnected shaft and bimetal to re-establish a desirable spacial relationship between the end of the bimetal and the air bleed valve assembly after a setting change of the control assembly.

3 Claims, 5 Drawing Figures

INVENTORS
Paul K. Beatenbough,
BY Ward H. Hutchins &
Gary E. Richards
K. H. MacLean, Jr.
ATTORNEY

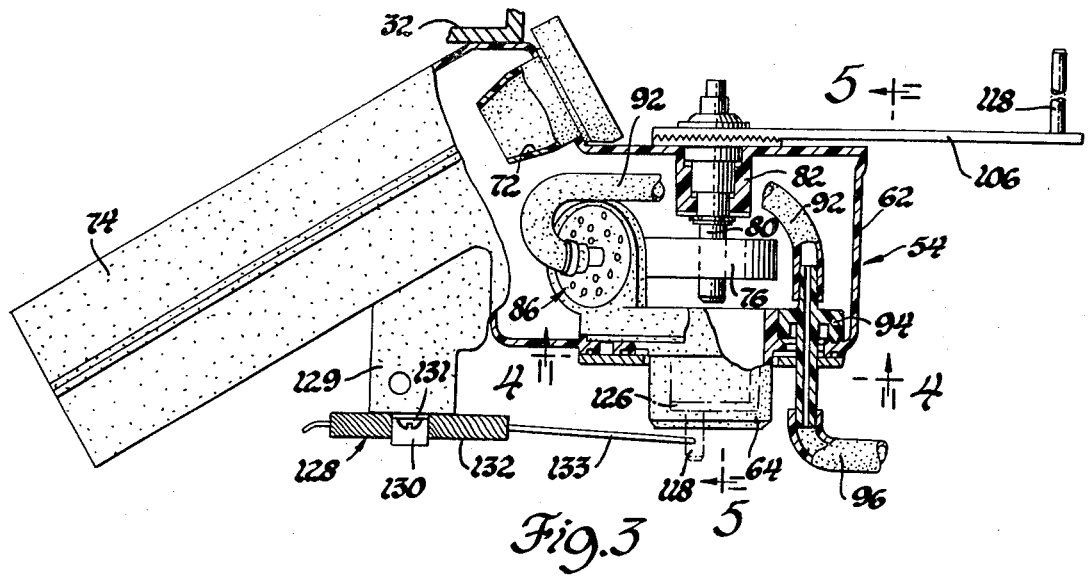
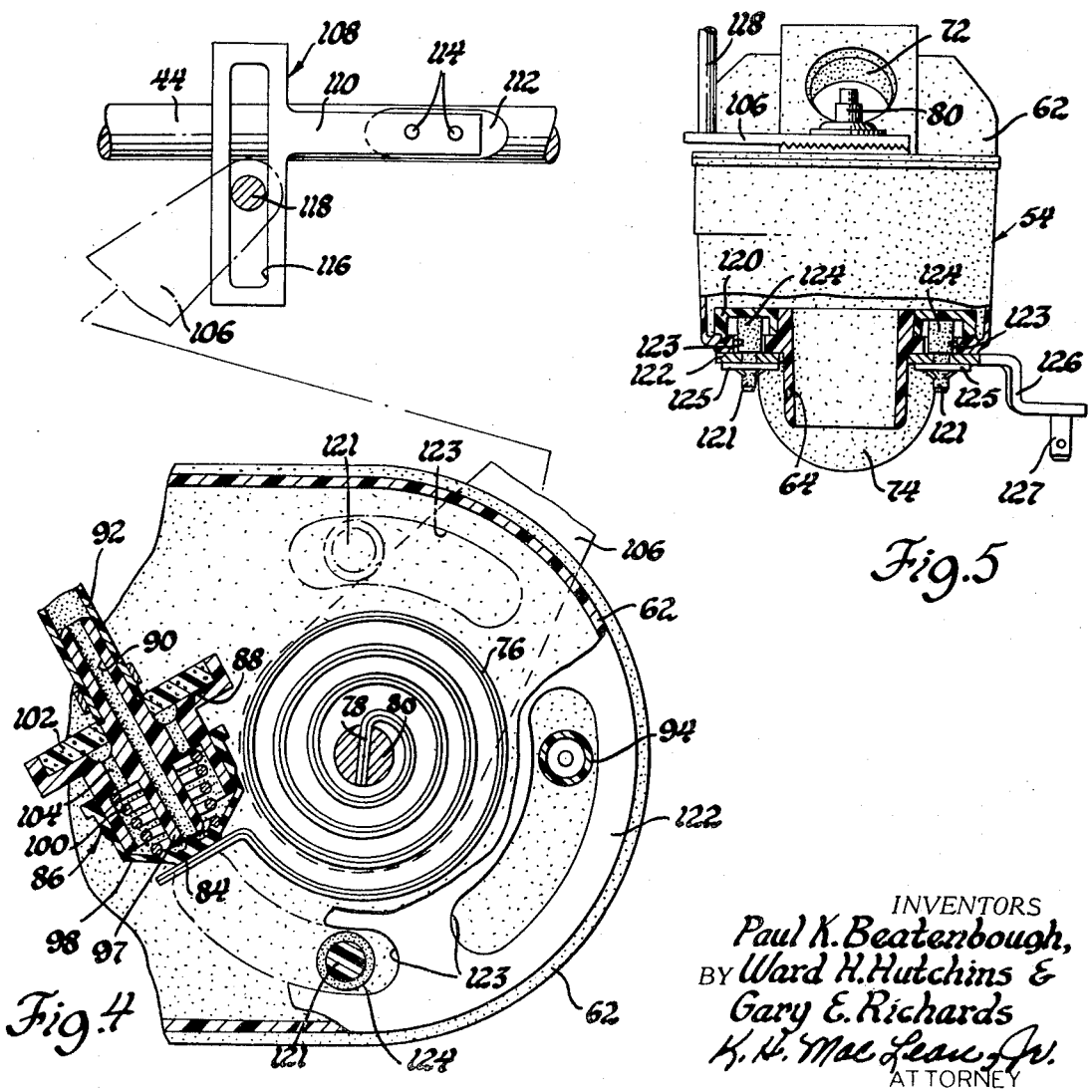

THERMOSTATIC VACUUM POSITIONER

This invention relates to an automatic temperature control system for automobile passenger compartment heating and cooling.

Prior automatic temperature control systems use a vacuum pressure regulator to produce changes in vacuum pressure proportional to air temperature. A bimetal and interconnected air bleed valve control the quantity of air which is bled into a vacuum line. The vacuum line is connected to a source of raw vacuum pressure and a vacuum operated actuator to position a temperature regulating member such as an air mix door. The air mix door is thus positioned in proportion to the vacuum pressure level produced by the vacuum regulator. Atmospheric and vacuum pressure forces on the air bleed valve are opposed by forces produced by the bimetal. These pressure forces must be overcome whenever the vacuum regulator changes the pressure level in response to temperature changes in the passenger compartment or a new setting of dash mounted temperature control. Thus, prior systems operate by developing a bimetal force proportional to the air temperature which force is applied to an air bleed valve to produce a vacuum pressure level proportional to temperature. The vacuum pressure then moves a vacuum actuator and interconnected air mix damper into a position which is also proportional to air temperature.

The present automatic temperature control system utilizes a spirally wound bimetal element to control the closing of a normally opened air bleed valve. A peripheral end of the spiral bimetal is located to coact with a diaphragm of an air bleed valve assembly. When the air temperature sensed by the spiral bimetal changes, or the air bleed assembly is moved by a dash mounted control member to a new temperature setting, the air bleed valve assembly is either opened or closed by relative movement between the air bleed valve assembly and the peripheral end of the spiral bimetal. The coaction between the end of the spiral bimetal and the diaphragm opens or closes the air bleed valve assembly to apply a low vacuum pressure or full vacuum pressure to the actuator respectively. The air damper is moved to a new position either by the action of the spring in the vacuum actuator corresponding to application of a low vacuum level to the actuator or by the force produced by full vacuum pressure applied to the actuator. The movement of the actuator by the spring or the vacuum pressure operates a feedback mechanism to adjust the spacial relation between the diaphragm of the air bleed valve assembly and the end of the spiral bimetal. The new position of the air bleed valve assembly and bimetal maintain the interconnected actuator and air mix door in a position to produce desirable air temperature in the passenger compartment corresponding to the setting of the control assembly.

An advantage of the present temperature control system is the elimination of large pressure forces generated against the bimetal element. Very little force is required to open and close the diaphragm of the air bleed valve of the present temperature control system. The absence of significant pressure forces on the bimetal tends to produce more accurate and consistent temperature control even when the pressure level of the vacuum source changes.

Another desirable feature of the present temperature controller is the use of a small ambient air temperature compensated heat exchanger which is placed between the dashboard inlet and the pressure regulator. When the ambient temperature is high, the air sample drawn into the pressure regulator which effects bimetal movement is warmer than would be the case without an ambient compensator. This produces a slightly cooler air flow into the passenger compartment. Conversely, if the ambient temperature is low, the temperature of air entering the pressure regulator is slightly less than otherwise would be the case and the temperature of air introduced into the passenger compartment is resultantly warmer.

An advantage inherent in the present air temperature control assembly is that full vacuum pressure from the engine manifold is available if necessary to overcome resistance in moving the actuator and air mix damper. Also, inaccuracies are eliminated which often result from the transmittal of relatively large forces through a Bowden wire type connection between the dashboard control and the vacuum regulator. These inaccuracies are a consequence of the differential diameters of the Bowden wire and the inner diameter of the sheath. When only a relatively small force is transmitted by the Bowden wire cable as in the present temperature controller, these position errors are greatly minimized.

Therefore, it is an object of the present invention to provide an automatic temperature control assembly for an automobile passenger compartment including a thermally responsive member adjacent an air bleed valve assembly connected to a vacuum line to generate either a low or a high vacuum pressure level for moving a vacuum and spring operated actuator and a connected air damper into position for effecting a desired air temperature.

A further object of the invention is to provide an automatic temperature control system having means for drawing air from a passenger compartment through an ambient temperature compensating heat exchanger and over a thermally responsive member which is coactive with an air bleed valve assembly to produce a high or low vacuum pressure for moving a vacuum and spring operated actuator and connected air damper into a position for effecting a desired air temperature.

A still further object of the invention is to provide an automatic temperature control for an automobile passenger compartment including means for withdrawing air from the passenger compartment and passing it over a spirally wound bimetal element having a peripheral end coactive with a diaphragm of an air bleed assembly which is connected to a vacuum pressure source and a vacuum operated actuator for moving a connected air damper to a desirable position for cooling and heating the passenger compartment.

Further objects and advantages of the present invention will be more readily apparent from the following detailed description, reference being had to the accompanying drawings in which a preferred embodiment is clearly shown.

In the drawings:

FIG. 3 is a partially sectioned view of the vacuum regulator shown in FIG. 1;

FIG. 4 is a sectioned view of the vacuum regulator shown in FIG. 3 taken along the section line 4—4 and looking in the direction of the arrows; and FIG. 5 is a partially sectioned view of the vacuum regulator shown in FIG. 3 taken along section line 5—5 looking in the direction of the arrows.

Figure 1:
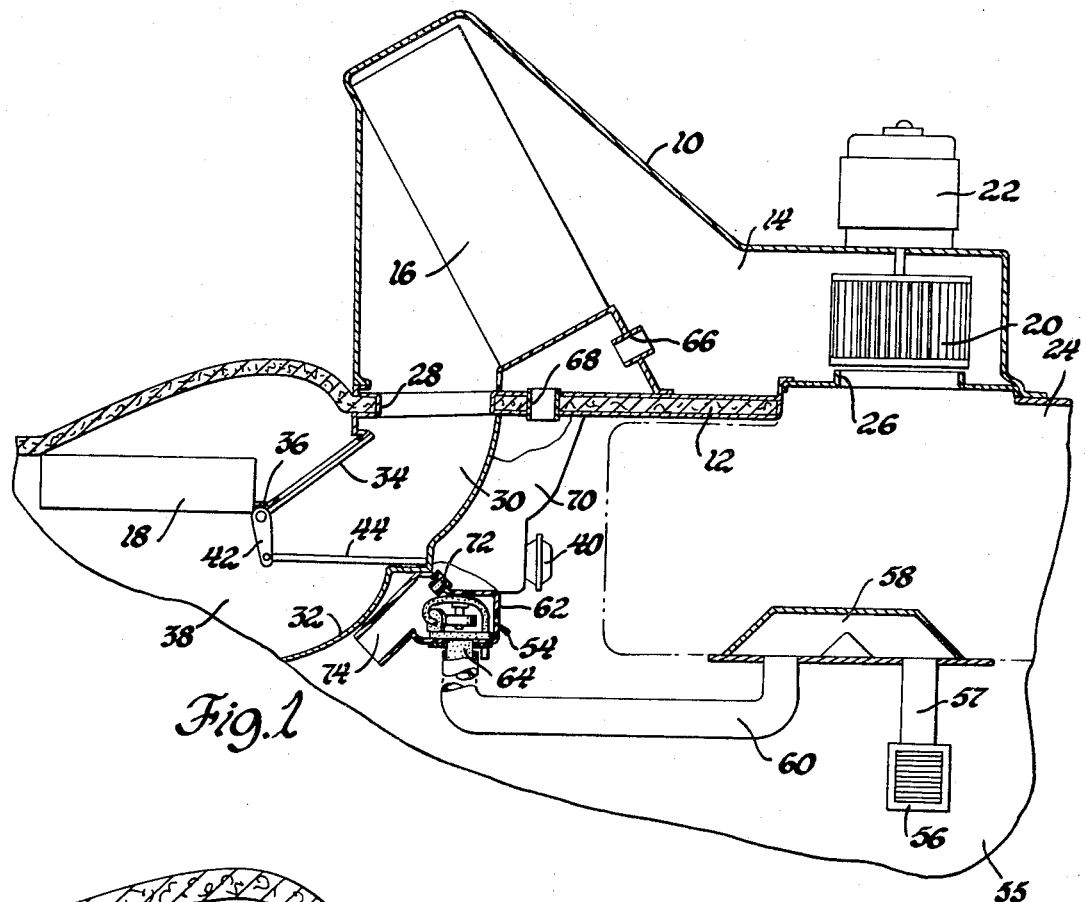
FIG. 1 is a fragmentary horizontal section of an automobile heating and air conditioning system with the present automatic temperature control system.

An automobile heating and air conditioning system is shown in FIG. 1. An air duct 10 and firewall 12 form air passage 14. An evaporator 16 and heater core 18 cool and warm air passing through air passage 14. A blower 20 driven by an electric motor 22 draws air from the passenger compartment 24 through an inlet opening 26 into air passage 14. After passing through the evaporator 16, the air flows through an opening 28 in the firewall 12 and into a chamber 30 which is formed inside the passenger compartment by duct wall 32. An air mix damper or door 34 is pivotally mounted at 36 and divides the air flow so that a portion of the flow passes through the heater core 18 and a portion bypasses the heater through a passage 38. Thus, a desirable air temperature is effected by mixing warm air passing from the heater with cool air bypassing the heater.

The damper door 34 is rotated within the chamber 30 by a spring and vacuum operated actuator 40 which is connected to a lever 42 of damper 34 by an arm 44. The vacuum actuator 40 has a flexible diaphragm 46 which is connected to arm 44 and a spring 48 which bears against the diaphragm 46. An inlet 50 connects the interior of the actuator 40 to a source of vacuum pressure. The vacuum pressure is transmitted to inlet 50 of actuator 40 by vacuum line 52 which is connected to the intake manifold of an automobile and to a vacuum regulator 54. The vacuum regulator 54 introduces a quantity of air into vacuum line 52 to produce a low vacuum pressure in the actuator 40 for positioning damper 34.

A bimetal element in the vacuum regulator senses the air temperature of the passenger compartment. More specifically, a sample of air is drawn from the passenger compartment 55 through an inlet 56 in the top of the dashboard and passed through a conduit 57 to an ambient temperature compensating heat exchanger 58. The heat exchanger 58 is in heat transfer relationship to exterior air of the passenger compartment. The air is then passed from the heat exchanger 58 through a conduit 60 and into a regulator housing 62, shown in FIG. 3. The housing 62 has an inlet 64 connected to conduit 60 for passing air over the bimetal member within the housing 62.

Air flow is induced through inlet 56 and the housing 62 by an aspirator assembly which includes openings 66 and 68 forming a passage from the outlet of blower 20 through the firewall 12 into the interior of a housing 70. A converging nozzle 72 supported within an opening through the housing 70 produces a fast moving air stream to an outlet 74 of the housing 62. The low pressure within the outlet 74 caused by this air stream draws air from the passenger compartment into the housing 62.

The air entering inlet 56 on the top of the dashboard is warmed by the sun which will modify the bimetal response when the sun radiation is great. The air then flows through heat exchanger 58 which is exposed to exterior ambient air to compensate the air sample for the outside temperature surrounding the automobile. Finally, the air sample passes into housing 62 and over the bimetal element of the vacuum regulator.

Details of the vacuum regulator are shown in FIGS. 3 through 5. It includes a spirally wound bimetal 76 which is supported at its central end 78 by a shaft 80. The shaft 80 extends through a portion 82 of housing 62 to permit rotation of the shaft 80 and bimetal element 76 in the housing. The other end 84 of the bimetal 76 is located at the bimetal's periphery and is bent radially outward with respect to the bimetal element. The end 84 moves in a generally circular path about the shaft 80 in response to temperature changes of air flowing through housing 62. An air bleed valve assembly 86 is supported adjacent the end 84 of the bimetal 76. The valve assembly 86 includes a fitting 88 having a passage 90 therethrough. The fitting 88 is connected by a flexible hose 92 to an inlet fitting 94 in the housing 62. Inlet fitting 94 extends through the housing 62 and is connected by a hose 96 to the vacuum line 52. The end 97 of the fitting 88 is adjacent the bimetal end 84 and is covered by a flexible diaphragm 98. The diaphragm 98 is normally spaced from the end 97 of the fitting 88 by a compression spring 100 to allow air to flow through a filter 102 and inlets 104 into the passage 90.

When the spiral bimetal 76 senses an air temperature change, the end 84 rotates about the shaft 80 and coacts with the diaphragm 98 to either open or close passage 90. The opening and closing of the passage 90 produces a low or a high vacuum pressure respectively to be applied to actuator 40. Consequently, the actuator 40 moves arm 44 and pivots the damper 34. The shaft 80 which supports the bimetal 76 is connected to a lever 106 extending into the interior of housing 70. The lever 106 contacts a feedback mechanism 108 attached to link 44 between the vacuum actuator 40 and the damper 34. A bracket 110 is secured to a flat spot 112 on link 44 by welds 114 and has an elongated slot 116 extending generally normal to link 44. A pin 118 on lever 106 extends into the slot 116 and rotates the lever 106 and shaft 80 when link 44 is moved by the actuator 40. This rotates the spiral bimetal 76 within housing 62 and moves the end 84 with respect to the air valve assembly 86.

The air valve assembly 86 is connected to an annular portion 120 which is rotatable about inlet fitting 64 of housing 62. When portion 120 is rotated, the diaphragm 98 is moved with respect to end 84 of the bimetal. Portion 120 is connected by pins 121 through the housing 62 to a member 122 on the outside of the housing. The pins 121 extend through circular slots 123 in the housing 62 and have cylindrical sleeves 124 around pins 121 to space the portion 120 from member 122 to allow rotation of assembly 86, portion 120 and the member 122 together. Fasteners 125 on pins 121 hold the member 122 to the housing 62. The rotatable member 122 has a radially extending lever portion 126 with a post 127 on its outward end. The post 127 is adapted to be connected to one end of a Bowden cable 128 which is supported by a bracket 129 attached to housing 62. The cable 128 is connected to bracket 129 by a strap 130 and fasteners 131. The cable 128 includes an outer elongated sleeve 132 surrounding a wire 133. The wire 133 slides axially through sleeve 132 and is attached at one end to the post 118. The other end of wire 133 is connected to a selector assembly at the dashboard of the automobile which may take the form of a lever or dial which is calibrated for manual selection of temperature desired from a range of temperatures. When the selector is moved to a new temperature setting, wire 133 moves lever 126 and rotates the connected air bleed valve 86 within housing 62. This moves the diaphragm 98 with respect to the end 84 of the spiral bimetal.

Figure 2:
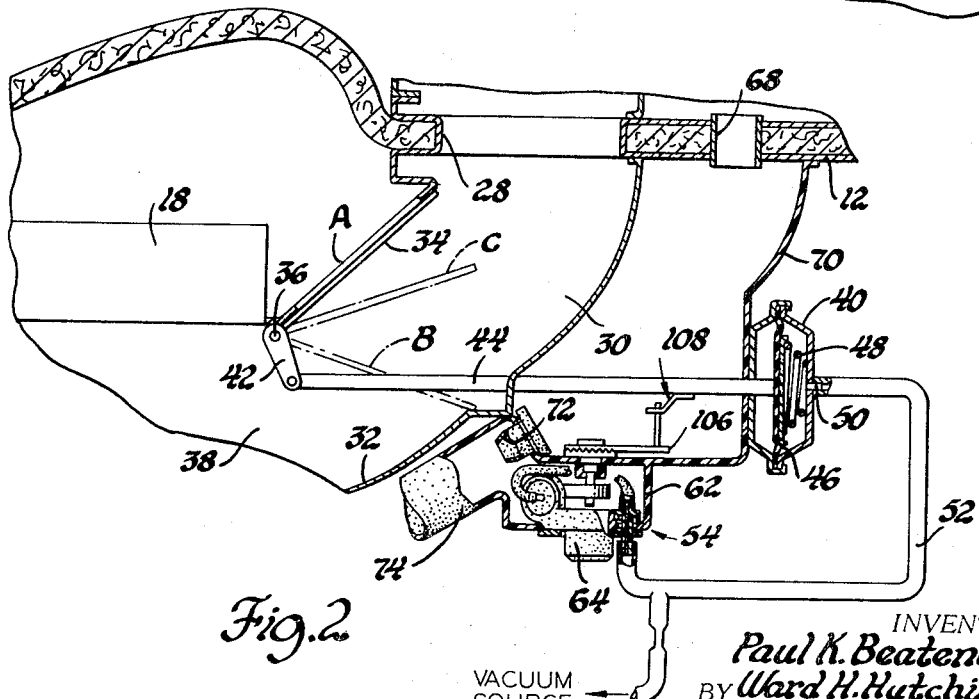
FIG. 2 is an enlarged view of the temperature control system shown in FIG. 1.

When the setting of the selector assembly is changed from one temperature to another, the diaphragm 98 of valve assembly 86 is moved with respect to end 84 of the spiral bimetal 76. This either opens or closes the passage 90 dependent upon whether a greater or a lesser temperature is selected. If the valve assembly 86 is moved against end 84 to close passage 90, maximum vacuum pressure is generated in actuator 40 which then moves to rotate damper 34 to position A in FIG. 2. This position produces maximum cooling for the passenger compartment 55. When a warmer temperature is selected, the diaphragm 98 of valve assembly 86 is moved away from end 84 of bimetal 76. This opens passage 90 to produce a low vacuum pressure which allows the spring 48 of actuator 40 to rotate damper 34 clockwise to assume position B which permits air to flow only through the heater core 18 for maximum heating. An intermediate position C of the damper 34 is attained which directs air both through the heater core 18 and the passage 30 for producing a desired temperature.

As a consequence of changing the temperature setting of the selector assembly, the actuator 40 moves damper 34 to produce the desired temperature setting of the selector. When the arm 44 is moved by the actuator 40, a bracket 110 coacts with a lever 106 to rotate the spiral bimetal 76. This moves the bimetal end 84 in the same direction which the valve assembly 86 was moved by the temperature selector. Thus, if the valve assembly 86 was rotated clockwise in FIG. 4 by the selector, the movement of arm 44 causes the bimetal 76 to rotate in a clockwise direction. Conversely, if the valve assembly 86 is rotated counterclockwise against the end 84 of bimetal 76, the resultant movement of arm 44 by the actuator 40 rotates the bimetal 76 counterclockwise to a new position with end 84 adjacent diaphragm 98.

While the embodiment of the invention described above is a preferred embodiment, it should be understood that other embodiments may be adapted.

What is claimed is as follows:

1. An automatic temperature control system for heating and cooling an automobile passenger compartment comprising: a temperature regulating member such as a damper for varying air temperature in said compartment; a vacuum and spring operated actuator operably connected to said damper for moving it between warm and cool operative positions; a vacuum line connecting said actuator and a source of vacuum pressure; a vacuum regulator connected to said vacuum line for changing the vacuum pressure in said actuator; an air duct and a blower for passing air from said compartment to a heater and back to said compartment; means forming an air passage from said blower into said compartment including a converging portion forming an aspirator; said vacuum regulator having a housing with an air inlet connected to said passenger compartment and an outlet connected to said aspirator for causing air to flow from said compartment through said regulator; an air bleed valve assembly in said housing including a passage connected with said vacuum line for admitting air into said vacuum line when a low level of vacuum pressure is needed in said actuator; a flexible diaphragm overlying said air bleed passage but spaced therefrom by a spring; a spirally wound bimetal in said housing supported at a central end by a rotatable shaft; said spiral bimetal having a peripheral end portion which moves in a circular path about said shaft in response to air temperature changes; said bimetal peripheral end adjacent and coactive with said diaphragm to open and close said air bleed passage in response to temperature changes; manually adjustable means in said passenger compartment for selecting a desired compartment temperature; means operably connecting said selector means and said vacuum regulator for producing relative movement between said peripheral end and said diaphragm in response to adjustments of said selector means; feedback means responsive to changes in the damper position for producing relative movement between said peripheral end and said diaphragm to re-establish a predetermined spacing therebetween subsequent to a change of their relative positions by movement of said adjustable selector means.

2. An automatic temperature control system for heating and cooling an automobile passenger compartment comprising: a temperature regulating member such as a damper for varying air temperature in said compartment; a vacuum and spring operated actuator operably connected by an arm to said damper for moving it between warm and cool operative positions; a vacuum line connecting said actuator to a source of vacuum pressure; a vacuum regulator connected to said vacuum line for changing the vacuum pressure in said actuator; an air duct and a blower for passing air from said compartment to a heater and back to said compartment; means forming an air passage from said blower into said compartment including a converging portion forming an aspirator; said vacuum regulator having a housing with an air inlet connected to the passenger compartment and an outlet connected to said aspirator for causing air to flow from said compartment through said regulator; an ambient temperature compensating heat exchanger operatively connected to said inlet to warm or cool the air before it enters said regulator; an air bleed valve assembly in said housing including a passage connected with said vacuum line for admitting air into said vacuum line when a low level of vacuum pressure is needed in said actuator; a flexible diaphragm overlying said air bleed passage but spaced therefrom by a light spring; a spirally wound bimetal in said housing supported at a central end by a rotatable shaft; said spiral bimetal having a peripheral end portion which moves in a circular path about said shaft in response to air temperature changes; said bimetal peripheral end being adjacent and coactive with said diaphragm to open and close said air bleed passage in response to temperature changes; a manually adjustable member such as a lever in said passenger compartment for selecting a desired compartment temperature; cable means including an elongated outer sleeve member and an inner movable wire connected between said manual selection means and said vacuum regulator for producing relative movement between said peripheral end and said diaphragm in response to adjustments of said selector means; feedback means responsive to changes in the damper position including a slotted bracket attached to said actuator arm and a lever member attached to said rotatable shaft which coact to produce relative movement between said peripheral end and said diaphragm for re-establishing a predetermined spacing therebetween subsequent to a change of their relative positions by movement of said adjustable selector means.

3. An automatic temperature control system for heating and cooling an automobile passenger compartment comprising: a temperature regulating member such as a damper for varying air temperature in said compartment; a vacuum and spring operated actuator operably connected by an arm to said damper for moving it between warm and cool operative positions; a vacuum line connecting said actuator to a source of vacuum pressure; a vacuum regulator connected to said vacuum line for changing the vacuum pressure in said actuator; an air duct and a blower for passing air from said compartment to a heater and back to said compartment; means forming an air passage from said blower into said compartment including a converging portion forming an aspirator; said vacuum regulator having a housing with an air inlet connected to the passenger compartment and an outlet connected to said aspirator for causing air to flow from said compartment through said regulator; an ambient temperature compensating heat exchanger operatively connected to said inlet to warm or cool the air before it enters said regulator; an air bleed valve assembly in said housing including a passage connected with said vacuum line for admitting air into said vacuum line when a low level of vacuum pressure is needed in said actuator; a flexible diaphragm overlying said air bleed passage but spaced therefrom by a light spring; a spirally wound bimetal in said housing supported at a central end by a rotatable shaft; said spiral bimetal having a peripheral end portion which moves in a circular path about said shaft in response to air temperature changes; said bimetal peripheral end alternately coactive with said flexible diaphragm to open and close said air bleed passage in response to temperature changes; a temperature selector member in the passenger compartment which is movable by an automobile occupant to a desired air temperature for the compartment; cable means including an elongated outer sleeve member and an inner movable wire connected at one end to said selector member and at its other end to said vacuum regulator for moving said air bleed valve assembly including said diaphragm relative to said peripheral end of said bimetal in response to adjustments of said selector member; feedback means responsive to changes in the damper position including a slotted bracket attached to said actuator arm and a lever member attached to said rotatable shaft which extends through said bracket slot to rotate said shaft and attached bimetal to move said peripheral end in a direction to re-establish a predetermined spacing between said peripheral end and said diaphragm subsequent to a change of their relative positions by movement of said adjustable selector member.

* * * * *